United States Patent [19]
Grossman

[11] 3,742,946
[45] July 3, 1973

[54] APPARATUS FOR THE IN VIVO TREATMENT OF BLOOD CONTAINING HARMFUL COMPONENTS RESULTING FROM CHRONIC UREMIA AND OTHER CONDITIONS

[76] Inventor: Charles M. Grossman, 9507 N.W. Roseway Avenue, Portland, Oreg.

[22] Filed: May 15, 1970

[21] Appl. No.: 37,532

[52] U.S. Cl. .............................. 128/214 R, 210/321
[51] Int. Cl. ............................................. A61m 5/00
[58] Field of Search .................... 128/214 R, 214 B, 128/213; 210/8.5, 22, 321

[56] References Cited
UNITED STATES PATENTS

| | | | |
|---|---|---|---|
| 3,485,751 | 12/1969 | Herrman et al. | 210/22 |
| 3,463,728 | 8/1969 | Kolobow et al. | 210/321 X |
| 2,664,395 | 12/1953 | Marchand | 210/321 |
| 2,687,997 | 8/1954 | Marchand | 210/321 |
| 3,388,803 | 6/1968 | Scott | 210/321 |
| 2,502,614 | 4/1950 | Zender | 210/321 X |
| 3,608,729 | 9/1971 | Haselden | 210/321 |
| 3,619,423 | 11/1971 | Galletti et al. | 210/321 X |

FOREIGN PATENTS OR APPLICATIONS

| | | | |
|---|---|---|---|
| 320,155 | 2/1970 | Sweden | 128/214 R |
| 953,414 | 3/1964 | Great Britain | |
| 953,414 | 3/1964 | Great Britain | |

OTHER PUBLICATIONS

Chang et al. Trans. Amer. Soc. Artif. Inter. Orgs. 1968 Vol. XIV, pp. 163–168.

Gordon et al. Trans. Amer. Soc. Artif. Inter. Orgs. 1969 Vol. XV, pp. 347–352.

Weinstein et al. Trans. Amer. Soc. Artif. Inter. Organs. Vol. XII 1966 26–32.

Primary Examiner—Dalton L. Truluck
Attorney—Eugene D. Farley

[57] ABSTRACT

Harmful components resulting from chronic uremia and other conditions are removed from blood by flowing the blood through a conduit comprising a semipermeable membrane capable of selectively passing bodies of low molecular weight. The conduit has in direct contact with its exterior surface a predetermined quantity of a finely divided solid material capable of reacting with the harmful components. Where the latter result from chronic uremia and include excess water, the finely divided solid material comprises a desiccant, in particular cross-linked dextran. Where the harmful components comprise salicylates, barbiturates and the like, the solid material comprises a solid adsorbent such as charcoal. In either case, the solid material collects the harmful components and thus decreases their concentration in the blood.

3 Claims, 4 Drawing Figures

PATENTED JUL 3 1973 3,742,946

CHARLES M. GROSSMAN
INVENTOR.
BY Eugene D. Farley
ATTY.

APPARATUS FOR THE IN VIVO TREATMENT OF BLOOD CONTAINING HARMFUL COMPONENTS RESULTING FROM CHRONIC UREMIA AND OTHER CONDITIONS

This invention relates to apparatus for the in vivo treatment of blood containing harmful components. It relates particularly to apparatus (artificial kidney) for the removal of harmful components resulting from chronic uremia or from the ingestion of excessive quantities of salicylates, barbiturates and other toxic materials taken in excess by accident or design.

As is well known, irreversible kidney failure creates in the patient a toxic condition characterized by the presence of excess water and waste products, including urea, creatinine, uric acid, and various inorganic salts including the chlorides and phosphates of sodium and potassium. Unless removed, these materials cause the death of the patient.

Development of the artificial kidney has provided a technique for relieving this condition and materially extending the life of the patient. However, artificial kidneys of the presently known types rely upon hemo-dialysis and utilize cumbersome, non-portable and expensive apparatus.

This normally requires hospitalization of the patient at frequently recurring intervals, or at least confinement to his home, if he has access to a home kidney machine. Because of the complexity and expense of such apparatus, all persons afflicted with the condition are not able to secure the necessary treatment.

It is the object of the present invention to provide apparatus for overcoming the foregoing problems by providing a lightweight, portable, blood-purifying apparatus which does not involve hemo-dialysis, which does not require attachment to plumbing, which is relatively inexpensive and which may be made widely available to persons afflicted with kidney disease.

It is another object of the invention to provide a kidney machine which although light and portable nevertheless has a relatively high capacity so that it may be used as a valuable supplement to present day dialyzers such as the Kolff and Kiil apparatus, reducing materially the frequency of necessary treatment by such apparatus.

Still a further object of the present invention is the provision of method and apparatus for the treatment of blood containing toxic components which is versatile in its application in that it not only is capable of removing toxic components resulting from chronic uremia, but also from poisoning by the injection of excessive amounts of toxic materials such as salicylates and barbiturates.

The manner in which the foregoing and other objects of the invention are accomplished will be apparent from the accompanying specification and claims considered together with the drawings wherein:

In general, the presently described method comprises flowing blood from a living patient through a conduit comprising a semipermeable membrane capable of selectively passing bodies of low molecular weight. The conduit has in direct contact with its exterior surface a predetermined quantity of a solid desiccant in finely divided condition. Advantage thus is taken of the ability of desiccants to accelerate the flow of water and small ions across the membrane where a proportion of the water is removed by the desiccant, Similarly, toxic bodies of low molecular weight may be adsorbed on a solid adsorbent such as charcoal, or reacted with reactants capable of removing them.

The apparatus employed for accomplishing the foregoing functions comprises simply a tube made of a semi-permeable membrane made of a material such as regenerated cellulose and open at both of its ends. Means are provided for attaching the infeed end to an artery and the outfeed end to a vein. Positioning means surround the tube for positioning a quantity of solid treating agent in contact with its exterior surface.

The treating agent may comprise a desiccant, an adsorbent, or a reactant capable of reacting with the harmful components of the blood. The positioning means may comprise an encasing sheath spaced from the tube with associated partitions; or a porous pad, the interstices of which are impregnated with the finely divided treating agent. Upon passing the blood through the tube, the harmful components which it contains pass through the membrane and are removed in substantial measure by the solid treating agent present on the exterior of the tube.

Figure 1:
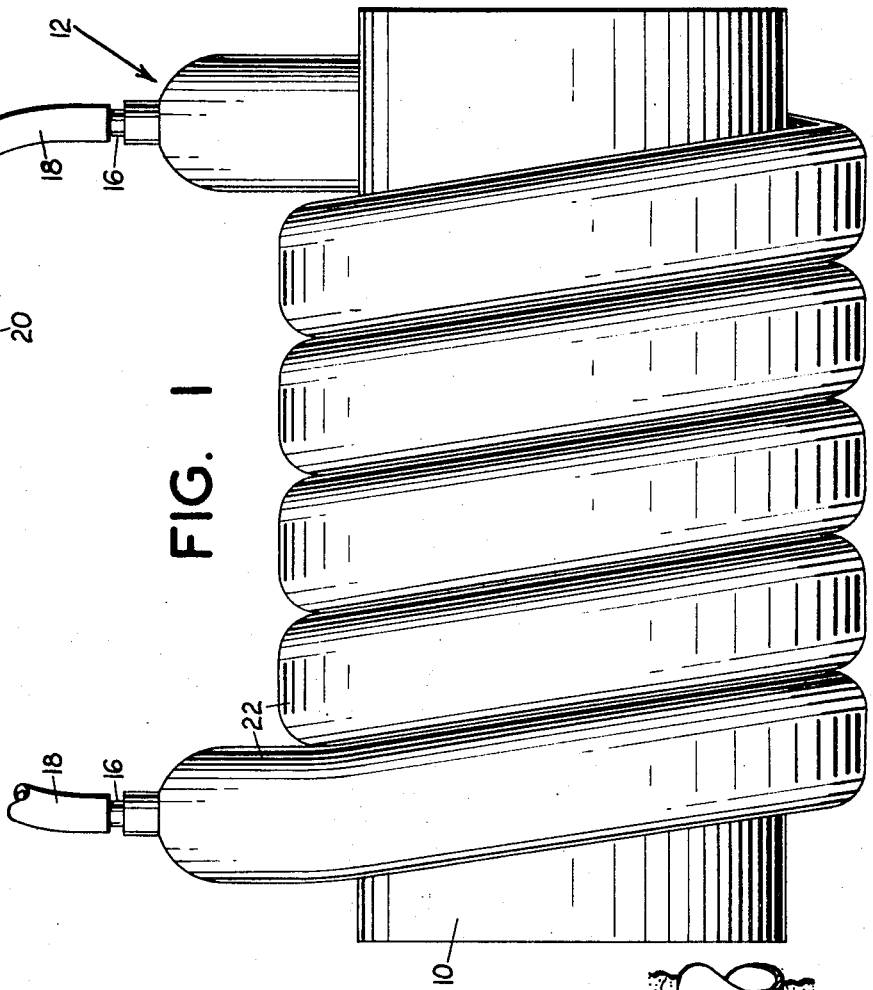
FIG. 1 is a view in side elevation of the herein described apparatus in a first embodiment.
Figure 2:
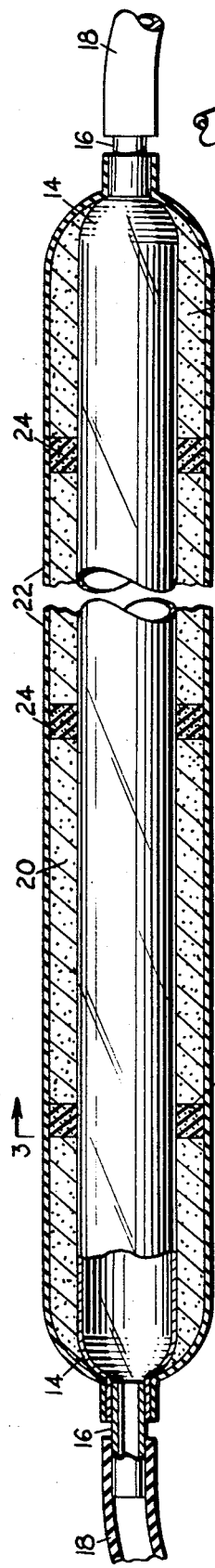
FIG. 2 is a foreshortened longitudinal section of the apparatus of FIG. 1.
Figure 3:
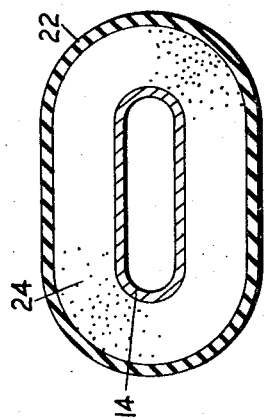
FIG. 3 is a transverse, sectional view taken along line 3—3 of FIG. 2.

Considering the foregoing in greater detail and with particular reference to the drawings:

In the form of the invention illustrated in FIGS. 1–3, the blood treating apparatus is mounted on a support 10 which may comprise any suitable material contoured in any desired manner. It may comprise, for example, a tube or cylinder of plastic, cardboard, wood or metal. The dimensions of the support are such that the entire assembly may be carried around conveniently by the patient.

Mounted on support 10 is the blood treating unit indicated generally by the numeral 12.

In the embodiment of FIGS. 1–3 this unit includes a central tube 14 fabricated from a semi-permeable membrane. The tube is of suitable length, for example, from 4–8 feet, and of corresponding diameter. It preferably is arranged flatwise, as shown in FIG. 3, to provide the maximum contact surface.

A diversity of semi-permeable membranes may be employed. The criterion determining suitability is the ability of the membrane to pass selectively bodies having a relatively low molecular weight, i.e. a molecular weight of less than about 10,000, while retaining those of higher molecular weight. The membrane thus can pass water; the decomposition products of proteins including creatinine, urea and uric acid; sodium chloride, potassium chloride and the other inorganic salts present in excessive amounts in conditions of chronic uremia; and salicylates, barbiturates and other poisonous materials present in the blood when an overdose of such materials is taken by the patient.

A variety of semi-permeable membranes are suitable for this purpose. Among these are those made of regenerated cellulose, cuprophane, collagen, collodion, polyvinyl copolymers, cellulose, and cellulose acetate.

The ends of the tube 14 are open and provided with a restricted gripping section designed for attachment to one end of a connector 16. The other end of the connector is attached to a tube 18 which in turn may be connected to a cannula by means of which blood is withdrawn from an artery or circulated back to a vein, as the case may be.

A quantity of finely divided solid treating agent 20 is placed in direct contact with the exterior surface of tube 14. Where the harmful components of the blood are those characteristic of chronic uremia, the treating agent comprises a solid desiccant. Cross-linked dextran is a preferred desiccant. Alternates includes starch; agar-agar; dextran; the polyacrylamides; the polyalkene oxides; desiccated proteins, such as casein, gelatin, egg albumin; and synthetic proteins such as polyglutamic acid and polylysine.

Where the harmful components of the blood comprise other materials such as salicylates and barbiturates, the solid material 20 comprises chemical adsorbents such as charcoal and zirconium. Where they comprise creatinine, urea, and uric acid, enzymes such as urease and cooperating ion exchange resins are used. Typical ion exchange resins include styrene, divinylbenzene, polymer lattices containing sulfonic and quaternary ammonium functional groups, and resins with carboxyl and quaternary ammonium functional groups.

The foregoing and other desiccants and treating agents are reduced in size so as to provide a large amount of available surface. Thus the cross-linked dextran is provided as a fine powder which is almost fluid in its flowing characteristics. The particle size of such material must be sufficiently large, however, so as not to pass through the semi-permeable membrane.

Means are provided for positioning the treating material in direct working contact with the outside surface of tube 14.

In the FIGS. 1–3 form of the invention, the positioning means comprises an external sheath 22 preferably fabricated from clear, resilient rubber. By virtue of its transparency, it is possible to inspect the interior of the apparatus to determine, for example, whether blood is leaking through semi-permeable membrane 14. Because of the resiliency of the sheath, expansion is possible as required to accommodate the accumulation of water which builds up within the chamber defined by tube 14 and sheath 22.

To prevent flowing of packing 20 from one end to the other of the apparatus as the latter is transported, particularly during the initial stages of the operation, there are provided a plurality of annular partitions 24. These comprise rings of cellulose sponge or similar readily deformable material which are interposed between tube 14 and sheath 22 at longitudinally spaced intervals.

Alternate means may be employed, however, for positioning the treating material in exterior surface contact with tube 14.

Figure 4:
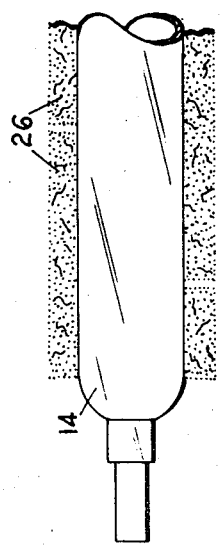
FIG. 4 is a fragmentary, longitudinal sectional view similar to FIG. 2, but illustrating the herein described apparatus in a second embodiment.

One such alternate means is illustrated in FIG. 4. It comprises a long strip 26 of porous filamentous material such as "hospital cotton." This is a coherent, fibrous, highly porous, cotton product which may be wrapped spirally about tube 14 in the indicated manner. Its pores may be filled with the pulverulent desiccant or other treating material. It acts to hold the treating material in close contact with the exterior surface of tube 14 in the required manner.

Assuming that the harmful components of the blood comprise those resulting from chronic uremia, the operation of the device is as follows:

As a preliminary measure, the patient normally is anticoagulated with heparin. At the termination of the procedure, the anticoagulant state is returned to normal with protamine.

The device is attached between an artery and vein of the patient by cannulation, the infeed end being attached to the artery and the outfeed end to the vein. Because the device is so efficient and hence accordingly of relatively short length, arterial pressure suffices to drive the blood through it at a flow rate of approximately 250–300 ml./min. Supplemental pumping apparatus may be supplied if desirable or necessary in special cases.

As the blood flows through tube 14, a certain proportion of the water passes through the membrane pores into desiccant 20. There it is fixed by the desiccant. If the latter is cross-linked dextran, it swells and becomes gel-like. The water thus is permanently removed from the blood stream so that the water content of the blood is reduced to tolerable levels.

Contemporaneously, there is a flow of the smaller molecules through the pores of the membrane. These include urea, creatinine, uric acid and various inorganic salts. Where the packing contained in sheath 22 comprises solely a disiccant, there is free interchange of such small molecules through the membrane in both directions. Accordingly the amount retained is minimal.

However, as has been noted above, components may be intermixed with the desiccant which shift this equilibrium in a direction causing migration of the undesirable small molecules from tube 14 into the solid packing surrounding the tube.

Thus where the harmful small molecules comprises urea, a proportion of urease may be mixed with the desiccant. This degrades the urea into various products including the ammonium ion.

In view of its extreme toxicity, it is necessary to remove the latter ion. This is accomplished by the inclusion in the desiccant mixture of a suitable ion exchange resin capable of capturing the ammonium ion. Thus a typical composition for use in accomplishing the above functions comprises the following:

|  | Parts by weight |
|---|---|
| Desiccant, e.g. cross linked dextran | 300 to 500 |
| Enzyme, e.g. urease | 0.8 to 1.2 grams |
| Ion exchange resin, e.g. polymer lattices containing sulfonic and quaternary ammonium functional groups | 600 to 800. |

The effect of the foregoing procedure is to remove a substantial proportion of the water from the blood. The amount thus removed is determined by the size and capacity of the apparatus, the nature of the desiccant, and the duration of treatment. However, in an operating period of eight hours, a sufficient amount of water is removed to relieve the patient considerably and thereby materially to extend the time between treatments on the dialysis-type kidney machine.

In a typical run, blood was passed through an apparatus similar to that illustrated in FIGS. 1–3, using a cellophane semi-permeable membrane and a desiccant comprising cross linked dextran ("Sephadex 150 G"). In a run of 8 hours duration, the desiccant took up approximately 50 grams of water for each 25 grams of desiccant. Where the apparatus was packed with agar, the ratio was 40 grams of water for each 25 grams of agar. It thus was possible, using a light weight portable ultra filter, to remove a total of 1,000 to 1,500 ml. water and associated small ions and molecules in approximately 8 hours without using a pump or requiring altered pressure.

Where the harmful components of the blood comprise toxic molecules such as salicylates and barbiturates ingested by the patient as as result of overdosage, such molecules pass through semi-permeable membrane 14 into the outer chamber. There they are trapped by contacting them with finely divided charcoal. This ties up the harmful components so that their concentration in the blood stream is reduced below fatal levels.

The procedure thus affords an effective emergency treatment for chemical poisoning and drug poisoning, in addition to serving as a routine procedure for the relief of patients suffering from chronic uremia.

Having thus described my invention in preferred embodiments, I claim as new and desire to protect by letters patent:

1. Apparatus for the in vivo treatment of blood containing harmful components resulting from chronic uremia and other conditions, which comprises:
   a. an elongated, flexible conduit open at both ends and comprising a semi-permeable membrane capable of selectively passing bodies of low molecular weight,
   b. means for connecting the infeed end of the conduit to an artery and the outfeed thereof to a vein,
   c. a quantity of solid, finely divided dessicant for accelerating the flow of water across the membrane, whereby to remove water from the blood,
   d. flexible and expandable retaining means confining the dessicant in contact with the exterior surface of the conduit substantially uniformly over the area of the conduit, and
   e. a support member mounting the elongated conduit in coiled condition thereon.

2. The apparatus of claim 1 wherein the dessicant retaining means comprises an elongated, flexible and expandable tube encircling the conduit and confining the dessicant therebetween, and a plurality of resiliently deformable annular partition members interposed between the conduit and tube at longitudinally spaced intervals for preventing longitudinal flow of said dessicant and thereby maintaining substantially uniform contact of the dessicant over the exterior surface of the conduit.

3. The apparatus of claim 1 wherein the dessicant retaining means comprises an elongated flexible and expandable strip of porous, filamentous material wrapped spirally about the conduit and having its pores filled with said dessicant.

* * * * *